R. MARKLEY.
DRINKING BOWL FOR ANIMALS.
APPLICATION FILED JUNE 1, 1911.
1,042,246.
Patented Oct. 22, 1912.
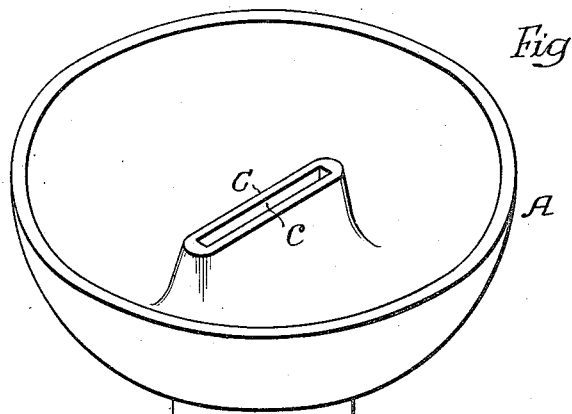
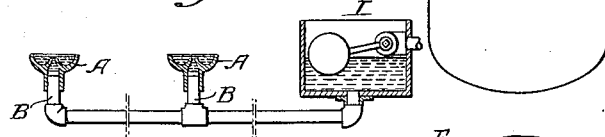
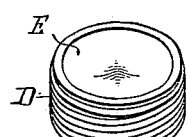
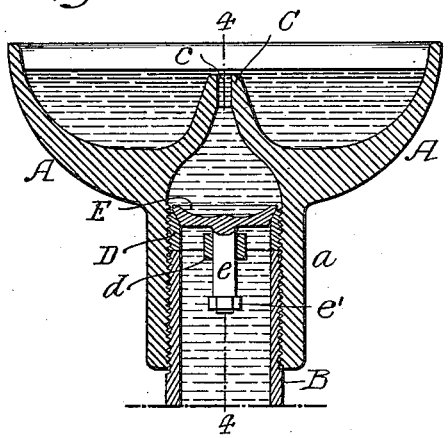
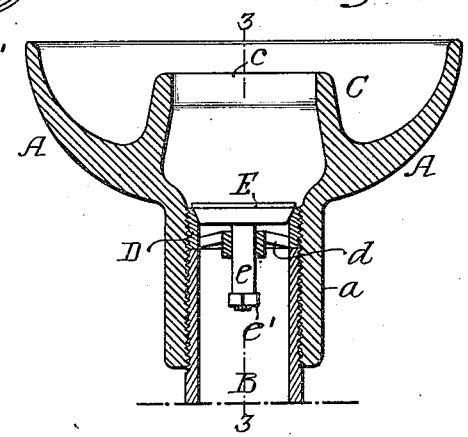
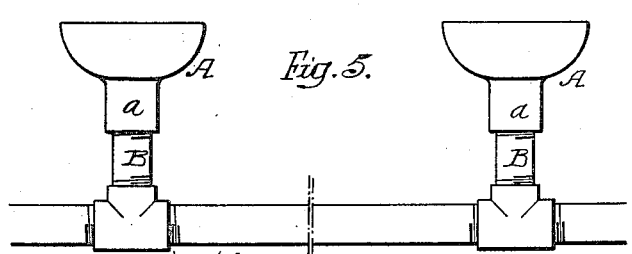
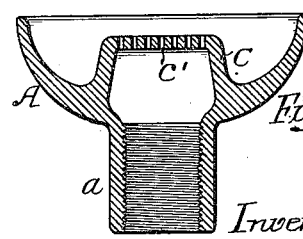
Witnesses:
Nella A. Burrows
Walter Chism
Inventor:
Richard Markley.
by his Attorneys.—
Howson & Howson

UNITED STATES PATENT OFFICE.

RICHARD MARKLEY, OF NORRISTOWN, PENNSYLVANIA.

DRINKING-BOWL FOR ANIMALS.

1,042,246. Specification of Letters Patent. Patented Oct. 22, 1912.

Application filed June 1, 1911. Serial No. 630,672.

*To all whom it may concern:*

Be it known that I, RICHARD MARKLEY, a citizen of the United States, residing in Norristown, county of Montgomery, State of Pennsylvania, have invented certain Improvements in Drinking-Bowls for Animals, of which the following is a specification.

The object of this invention is to construct a drinking bowl for animals, particularly cattle, so that the animal will be attracted to the bowl by the water normally within it. When a cow, for instance, is drinking from my improved bowl, the water, which she drinks, comes directly from the supply pipe and not from the bowl.

A further object of the invention is to construct the bowl so that it can be kept clean.

In the accompanying drawings:—Figure 1, is a perspective view of my improved drinking bowl for animals; Fig. 2, is a detached, perspective view of the check valve; Fig. 3, is a sectional elevation on the line 3—3, Fig. 4; Fig. 4, is a sectional elevation on the line 4—4, Fig. 3; Fig. 5, is a view, showing two of the bowls coupled to the supply pipe; Fig. 6, is a view illustrating a modification of the invention; and Fig. 7 is a view in outline showing the bowls connected to a float box.

Drinking bowls or founts used in supplying water to cattle are usually located in the stall of the animal and there should be one bowl for each animal. Heretofore, the great difficulty has been to provide a bowl which could be kept absolutely clean and which would not contain a large quantity of stagnant water; such water being detrimental to the health of the animal drinking of it. Applicant's bowl is so shaped and proportioned that it holds but a small quantity of water and an animal drinking from this bowl drinks only fresh water as it passes through the nozzle. Experiments have demonstrated the fact that a cow will place her mouth directly over the nozzle and will not drink from the bowl, after the water in the bowl has been lowered to the nozzle. Applicant's improved bowls are connected to a common supply pipe leading from a float box, so that the proper level of water in each bowl will be maintained.

A is the body of the bowl, preferably circular in form, and of any depth desired; the form illustrated in Fig. 3, being the form preferred. The bowl has an extension $a$, in which there is an internal screw thread and the supply pipe B is screwed into this extension, as illustrated. C is the nozzle, which projects from the bottom of the bowl and is so arranged in respect to the float box I that the water supply is above the upper end of the nozzle, as indicated in Fig. 3. The nozzle is oblong, as shown in the perspective view, Fig. 1, and has an elongated slot therein, as indicated at $c$. The particular shape and size of the nozzle will depend upon the animal for which the bowl is intended.

A check valve is located within the extension $a$ so as to prevent the water, which has passed into the nozzle from being carried back into the supply pipe, or into another bowl. This check valve consists of a screw threaded body D having a spider $d$, and on the end of this body is a valve seat for the reception of the tapered valve E. The step $e$ of this valve passes through the spider and is threaded at its lower end and mounted on the threaded portion is a nut $e'$, which limits the upward movement of the valve. This valve is comparatively light and is so arranged that the moment an animal commences to drink, the pressure of the water back of the valve, as well as the suction due to the animal drinking the water, will cause the valve to lift off its seat and will allow the water to freely flow through the nozzle. Any suitable form of check valve may be used without departing from the essential features of the invention.

While I have shown the nozzle with an elongated slot therein, the nozzle may have a perforated opening, as illustrated at $c'$, Fig. 6, which may act as a strainer.

It will be noticed that the bottom of the bowl is rounded and I preferably form a channel entirely around the nozzle. By this construction, the bowls can be quickly and thoroughly cleansed so as to keep the bowl free from the accumulation of feed, or any foreign matter, which might gain access to the bowl.

I claim:

1. The combination of a drinking bowl for animals consisting of a body portion closed at the bottom; and a nozzle shaped to be taken into the mouth by an animal and projecting upward into the bowl; with means for supplying water to the bowl through the nozzle, said means maintaining the water in the bowl at a level slightly above the end of the nozzle so that the nozzle is submerged when not in use.

2. A drinking bowl for animals consisting of a body portion closed at the bottom; a nozzle projecting upward from the bottom of the bowl and shaped to be taken into the mouth by an animal and having a passage therein communicating with the water supply, said nozzle being less in height than the sides of the bowl and communicating with a water supply, whereby the bowl is supplied with water through the nozzle, the top of the nozzle being directly below the water line of the bowl.

In testimony whereof, I have signed my name to this specification, in the presence of two subscribing witnesses.

RICHARD MARKLEY.

Witnesses:
WM. E. SHUPE,
WM. A. BARR.

---

Copies of this patent may be obtained for five cents each, by addressing the "Commissioner of Patents, Washington, D. C."